United States Patent
Kim et al.

(10) Patent No.: US 10,352,376 B2
(45) Date of Patent: Jul. 16, 2019

(54) CLUTCH CONTROL METHOD OF VEHICLE

(71) Applicant: Hyundai Motor Company, Seoul (KR)

(72) Inventors: Jin Sung Kim, Hwaseong-si (KR); Ju Hyun Nam, Bucheon-si (KR)

(73) Assignee: Hyundai Motor Company, Seoul (KR)

( * ) Notice: Subject to any disclaimer, the term of this patent is extended or adjusted under 35 U.S.C. 154(b) by 363 days.

(21) Appl. No.: 15/372,174

(22) Filed: Dec. 7, 2016

(65) Prior Publication Data

US 2018/0017112 A1    Jan. 18, 2018

(30) Foreign Application Priority Data

Jul. 15, 2016    (KR) .................. 10-2016-0089801

(51) Int. Cl.
*F16D 48/06*    (2006.01)

(52) U.S. Cl.
CPC .... F16D 48/06 (2013.01); *F16D 2500/10412* (2013.01); *F16D 2500/1107* (2013.01); *F16D 2500/3027* (2013.01); *F16D 2500/3065* (2013.01); *F16D 2500/30412* (2013.01); *F16D 2500/3144* (2013.01); *F16D 2500/31446* (2013.01); *F16D 2500/50287* (2013.01); *F16D 2500/7044* (2013.01); *F16D 2500/70247* (2013.01); *F16D 2500/70408* (2013.01); *F16D 2500/70426* (2013.01); *F16D 2500/70668* (2013.01)

(58) Field of Classification Search
None
See application file for complete search history.

(56) References Cited

U.S. PATENT DOCUMENTS

| | | | |
|---|---|---|---|
| 6,253,140 B1* | 6/2001 | Jain | F16D 48/06 192/3.3 |
| 2006/0161325 A1* | 7/2006 | Jiang | B60W 10/02 701/54 |
| 2007/0265137 A1* | 11/2007 | Jiang | B60W 10/02 477/176 |
| 2015/0211625 A1* | 7/2015 | Fujii | F16H 59/02 74/473.3 |

(Continued)

FOREIGN PATENT DOCUMENTS

| | | |
|---|---|---|
| JP | H08-177890 A | 7/1996 |
| JP | H09-269024 A | 10/1997 |
| JP | 2007-016887 A | 1/2007 |

(Continued)

*Primary Examiner* — Jacob S. Scott
(74) *Attorney, Agent, or Firm* — Morgan, Lewis & Bockius LLP

(57) ABSTRACT

A clutch control method of a vehicle may include estimating a change in an input torque supplied by a power source based on an extent to which an acceleration pedal is depressed by the controller; obtaining an additional torque at a level to prevent slippage of a clutch against the input torque estimated in the estimating of a change in input torque by the controller; determining a final clutch control torque for controlling the clutch by adding the additional torque, which is obtained in the obtaining of an additional torque, to the input torque by the controller; and controlling the clutch by operating a clutch actuator with the final clutch control torque determined in the determining of a final clutch control torque by the controller.

4 Claims, 4 Drawing Sheets

(56) References Cited

U.S. PATENT DOCUMENTS

2016/0068163 A1* 3/2016 Fujii .................... B60W 30/19
710/54

FOREIGN PATENT DOCUMENTS

| JP | 2012-006575 A | 1/2012 |
| JP | 2013-57373 A | 3/2013 |
| JP | 2013-79707 A | 5/2013 |
| KR | 10-2011-0012527 A | 2/2011 |
| KR | 10-2012-0068405 A | 6/2012 |
| KR | 10-2016-0005251 A | 1/2016 |

* cited by examiner

CLUTCH CONTROL METHOD OF VEHICLE

CROSS REFERENCE TO RELATED APPLICATION

The present application claims priority to Korean Patent Application No. 10-2016-0089801, filed Jul. 15, 2016, the entire contents of which are incorporated herein for all purposes by this reference.

BACKGROUND OF THE INVENTION

Field of the Invention

Various embodiments of the present invention relates to a clutch control method of a vehicle and, more particularly, to a method of a dry clutch for transmitting power in a vehicle.

Description of Related Art

Some AMTs (Automated Manual Transmission) or DCTs (Dual Clutch Transmission) receive power from a power source such as an engine or a motor using a dry clutch (hereafter, "clutch").

In an In-Gear state, in which a vehicle is driven without shifting, the clutch is fully engaged and transmits power from a power source. In this case, when Tip-in, in which a driver suddenly presses down the acceleration pedal, occurs, the clutch may become slightly disengaged and may slip excessively.

When a clutch is slightly disengaged and slips excessively, as described above, the vehicle may jolt, or acceleration thereof may be delayed, due to a sudden change in the amount of power transmitted by the clutch, so the drivability of the vehicle is deteriorated. Further, the power transmission efficiency of the clutch decreases, resulting in a reduction in the fuel efficiency of the vehicle.

One of the reasons for excessive slippage in a Tip-in state may be the inaccuracy of a so-called Torque-Stroke Curve (T-S curve), which depicts the transmission characteristics of a clutch to the stroke of an actuator controlling the clutch.

That is, when a clutch is fully engaged, the transmission torque of the clutch is maintained at almost the same level as the input torque from a power source, in which a controller controls the stroke of an actuator to achieve a target clutch transmission torque corresponding to the input torque. However, the actual transmission torque of the clutch is lower than the input torque due to the inaccuracy of a T-S curve that is the reference for the control, and in this case, the clutch slips, as described above.

Another factor causing excessive slippage upon Tip-in may be that the controller cannot control the clutch transmission torque at a response speed that is fast enough to follow changes in torque input from the power source.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a clutch control method of a vehicle, the method preventing deterioration of drivability of the vehicle due to jolting of the vehicle and delayed acceleration due to unexpected excessive slippage of a clutch by appropriately controlling the transmission torque of the clutch even if the input torque to be input to the clutch is suddenly changed due to the sudden operation of an acceleration pedal by a driver, the method also preventing deterioration of fuel efficiency of the vehicle by preventing a reduction in the power transmission efficiency of the clutch.

In an aspect of the present invention, there is provided a clutch control method of a vehicle, including: estimating a change in input torque supplied by a power source based on an extent to which an acceleration pedal is depressed by the controller; obtaining additional torque at a level sufficient to prevent slippage of a clutch against the input torque estimated in the estimating of a change in input torque by the controller; determining a final clutch control torque for controlling the clutch by adding the additional torque, which is obtained in the obtaining of an additional torque, to the input torque by the controller; and controlling the clutch by operating a clutch actuator with the final clutch control torque determined in the determining of a final clutch control torque by the controller.

In the estimating of an input torque, the controller may obtain an operation variation by differentiating the depressed extent of the acceleration pedal to time, may obtain a delay operation variation by moving the operation variation by a predetermined time delay on a time axis, and may obtain a torque response function showing a change in the input torque by filtering the delay operation variation.

The time delay may be set as a time for which a delay occurs until a change is generated in the input torque supplied by the power source in accordance with a change in the depressed extent of the acceleration pedal.

The controller may obtain the torque response function by processing the delay operation variation with a low-pass filter, and a coefficient of the low-pass filter may be set in advance such that the delay operation variation follows a profile constructed by the input torque supplied by the power source.

The controller, in the obtaining of an additional torque, may obtain an additional torque for a value of function of the torque response function from an additional torque map having information about an additional torque for each value of function of the torque response function.

According to an exemplary embodiment of the present invention, it is possible to prevent deterioration of drivability of the vehicle due to jolting of the vehicle and delayed acceleration by unexpected excessive slippage of a clutch by appropriately controlling transmission torque of the clutch even if input torque to be input to the clutch is suddenly changed by sudden operation of an acceleration pedal by a driver, and to prevent deterioration of fuel efficiency of the vehicle by preventing a reduction in the power transmission efficiency of the clutch.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
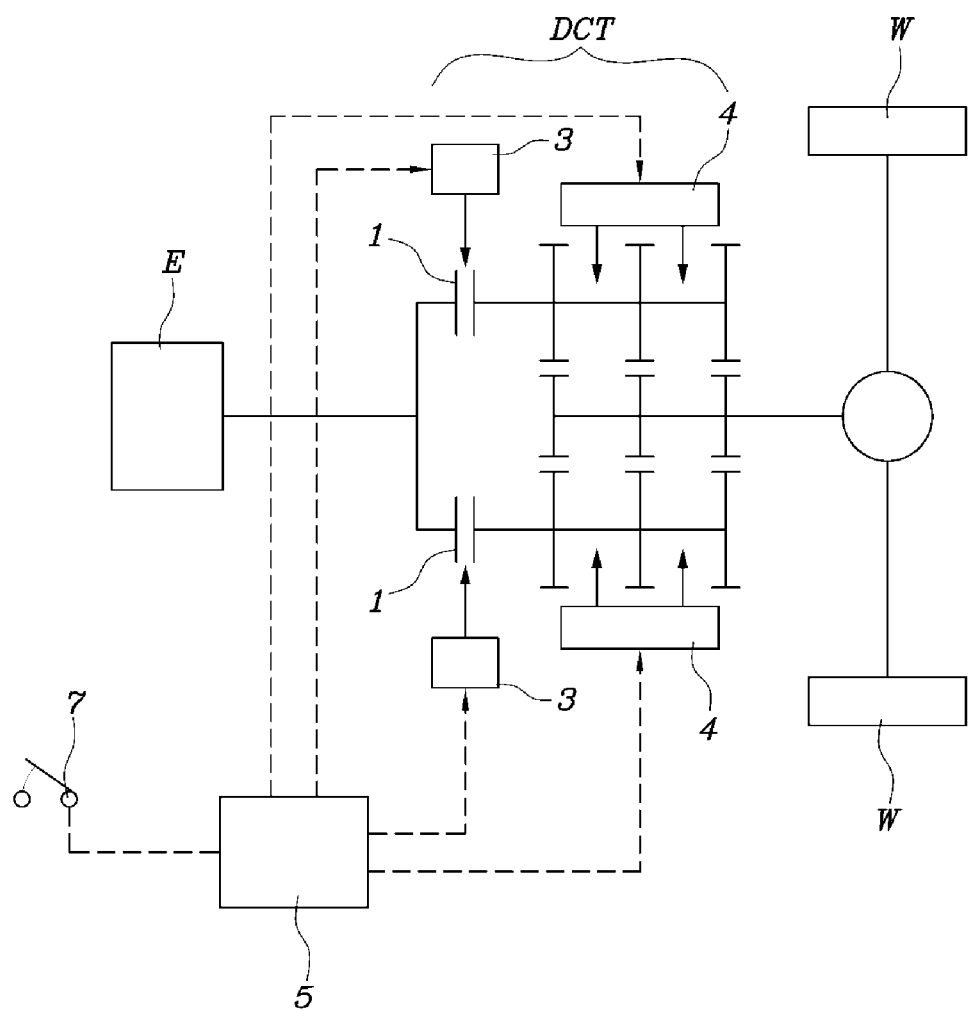
FIG. 1 is a diagram showing the configuration of a vehicle with a DCT to which the present invention can be applied.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIG. 1, power from an engine E can be supplied to driving wheels W through a Dual Clutch Transmission (DCT), two clutches of the DCT are controlled by respective clutch actuators 3, gears for gear stages are shifted by respective shift actuators 4, which selectively drive synchronizers, the clutch actuators 3 and the shift actuators 4 are controlled by a controller 5, and the controller 5 receives signals from an APS 7 (Acceleration Position Sensor) to recognize the extent to which an acceleration pedal is depressed.

Obviously, the controller 5 also receives information about the engine torque and engine speed.

The term 'controller' means a transmission controller for controlling a transmission including a DCT, unless a specific prefix precedes to the term, and a controller for controlling an engine will be referred to as an 'engine controller' to distinguish it from other elements.

Figure 2:
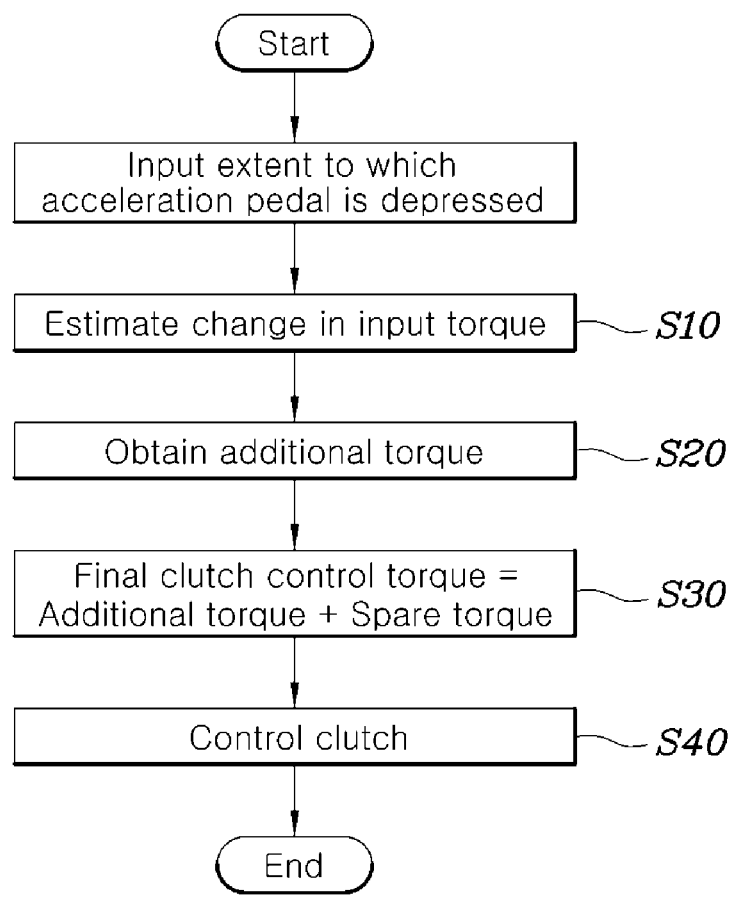
FIG. 2 is a flowchart illustrating an exemplary embodiment of a clutch control method of a vehicle according to an exemplary embodiment of the present invention.
Figure 3:
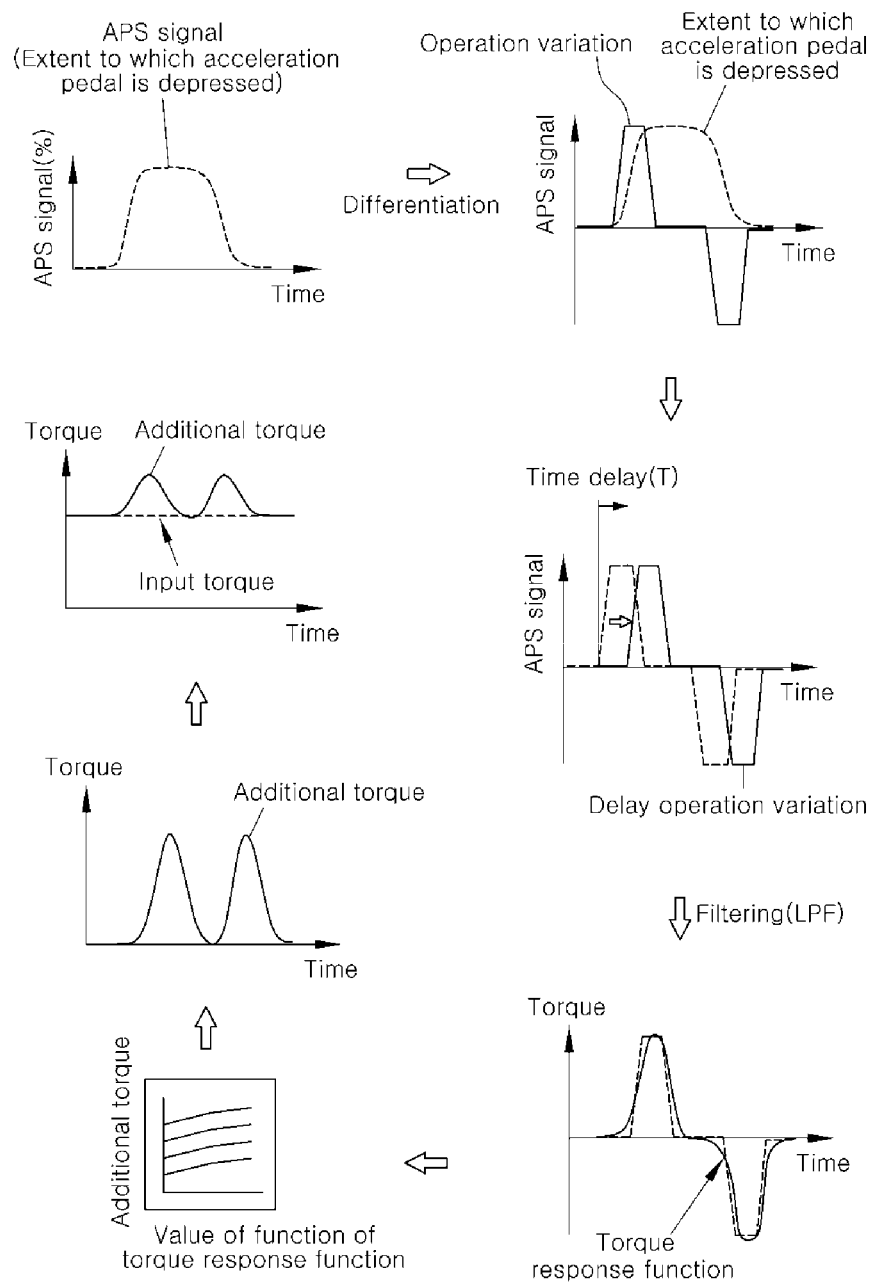
FIG. 3 is a diagram showing the principle of the present invention.
Figure 4:
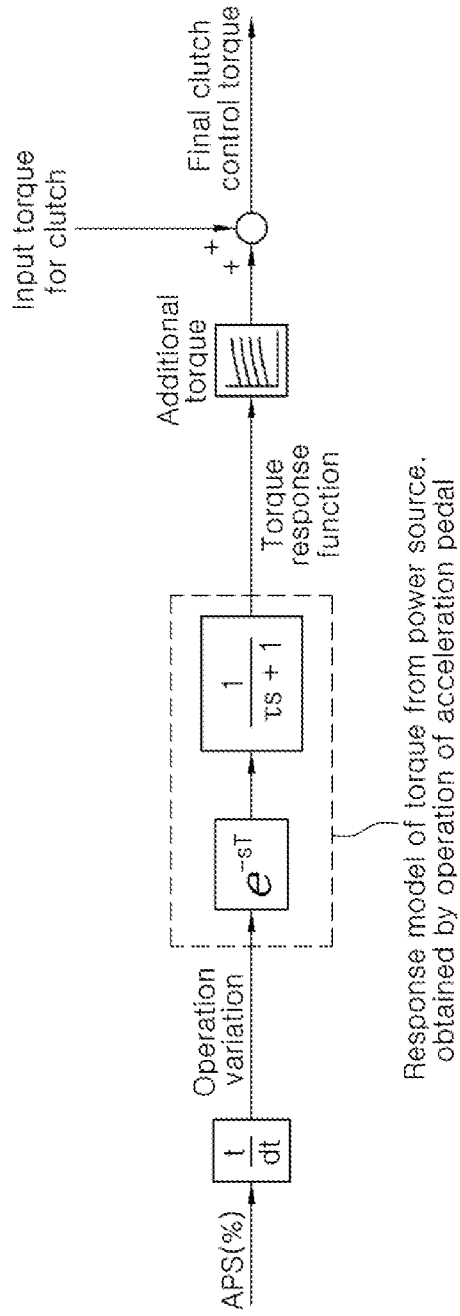
FIG. 4 is a control block diagram illustrating the principle of the present invention.

Referring to FIG. 2 and FIG. 3, a clutch control method of a vehicle according to an exemplary embodiment of the present invention includes: estimating a change in input torque supplied by a power source based on the extent to which an acceleration pedal is depressed by the controller 5 (S10); obtaining additional torque at a level sufficient to prevent slippage of the clutch 1 against the input torque estimated in the estimating of a change in input torque (S10) by the controller 5 (S20); determining a final clutch control torque for controlling the clutch by adding the additional torque, which is obtained in the obtaining of an additional torque (S20), to the input torque by the controller 5 (S30); and controlling the clutch 1 by operating the clutch actuator 3 with the final clutch control torque determined in the determining of a final clutch control torque (S30) by the controller 5 (S40).

That is, according to an exemplary embodiment of the present invention, when a driver is not pressing down an acceleration pedal and is not shifting, a clutch is fully engaged, and almost all of the power from an engine, which is the power source, is transmitted to a transmission when the driver presses down the acceleration pedal, the controller 5 receives an APS signal showing the extent to which the acceleration pedal is depressed, estimates how much torque is generated by the engine E and acts as input torque for the clutch, depending on the extent to which the acceleration pedal is depressed, finds out how much clutch transmission torque needs to be additionally applied to the clutch 1 to prevent slippage of the clutch 1 even under a change of the estimated input torque, adds the additional torque to the input torque for the clutch 1, and controls the clutch 1 with this sum of torque, preventing excessive slippage of the clutch due to Tip-in during In-gear driving.

As described above, since the controller 5 determines additional torque for a change in the input torque that is output from the engine E, which is a power source, in response to the extent to which the acceleration pedal is depressed by the driver and is then input to the clutch 1 and uses the additional torque to control the transmission torque of the clutch, it is possible to solve the problem in the related art whereby the drivability of the vehicle is deteriorated by jolting or acceleration delay due to unexpected excessive slippage of the clutch, and it is possible to prevent a reduction in the fuel efficiency of the vehicle by preventing a reduction in the power transmission efficiency of the clutch.

For reference, although the power source is an engine E in the present exemplary embodiment, when it is a hybrid vehicle equipped with both an engine and a motor, both the engine and the motor may supply the input torque as the power source, or the present invention may be applied to an electric vehicle equipped only with a motor as the power source.

In the estimating of an input torque (S10), the controller 5 obtains an operation variation by varying the extent to which the acceleration pedal is depressed over time, obtains a delay operation variation by moving the operation variation by a predetermined time delay on a time axis, and obtains a torque response function showing a change in the input torque by filtering the delay operation variation.

The time delay is set as the time for which a delay occurs until a change is generated in the input torque from the power source in accordance with a change in the extent to which the acceleration pedal is depressed.

That is, when the power source is an engine and an APS signal is changed by the driver operating the acceleration pedal, the average time that is taken until the output torque from the engine actually changes is the time delay. The time delay actually depends on the specifications of the engine or motor that is used as the power source, so it is possible to obtain an average through repeated tests.

The controller 5 obtains the torque response function by processing the delay operation variation with a low-pass filter, and a coefficient of the low-pass filter is set in advance such that the delay operation variation follows a profile constructed by the input torque from the power source.

The coefficient of the low-pass filter is determined according to design requirements and with reference to a set value of the engine controller 5 or the results of tests on an engine, accompanied by repeated testing and analysis to determine the optimal coefficient.

The controller 5, in the obtaining of an additional torque (S20), obtains additional torque for a value of function of the torque response function from an additional torque map having information about additional torque for each value of function of the torque response function.

The additional torque map may be obtained by mapping a function in which the values of function of the torque response function are independent variables and the additional torque is a dependent variable. Further, the additional torque map may be constructed by repeated testing to monitor whether a fully engaged clutch slips by changing the extent to which an acceleration pedal is depressed in a vehicle and by determining the additional torque corresponding to the values of function of the torque response function in a table. Obviously, depending on the design, spare torque may be added to secure stability in the test results when determining the additional torque.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A clutch control method of a vehicle, the method comprising:
    estimating a change in an input torque supplied by a power source from a depressed extent of an acceleration pedal by a controller;
    obtaining an additional torque at a level to prevent slippage of a clutch against the input torque estimated in the estimating of the change in the input torque by the controller;
    determining a final clutch control torque for controlling the clutch by adding the additional torque, which is obtained in the obtaining of the additional torque, to the input torque by the controller; and
    controlling the clutch by operating a clutch actuator with the final clutch control torque determined in the determining of the final clutch control torque by the controller,
    wherein in the estimating of the input torque, the controller obtains an operation variation by differentiating the depressed extent of the acceleration pedal to time, obtains a delay operation variation by moving the operation variation by a predetermined time delay on a time axis, and obtains a torque response function showing a change in the input torque by filtering the delay operation variation.

2. The method of claim 1, wherein the predetermined time delay is set as a time for which a delay occurs until a change is generated in the input torque supplied by the power source in accordance with a change in the depressed extent of the acceleration pedal.

3. The method of claim 1, wherein the controller obtains the torque response function by processing the delay operation variation with a low-pass filter, and a coefficient of the low-pass filter is set in advance, wherein the delay operation variation follows a profile constructed by the input torque supplied by the power source.

4. The method of claim 1, wherein the controller, in the obtaining of the additional torque, obtains the additional torque for a value of function of the torque response function from an additional torque map having information about the additional torque for each value of function of the torque response function.

* * * * *